Jan. 15, 1935.  L. A. DUMSER  1,988,267
MACHINE TOOL
Filed Jan. 15, 1932   4 Sheets-Sheet 1

Inventor:
Leo A. Dumser,
By [signature]
his Atty.

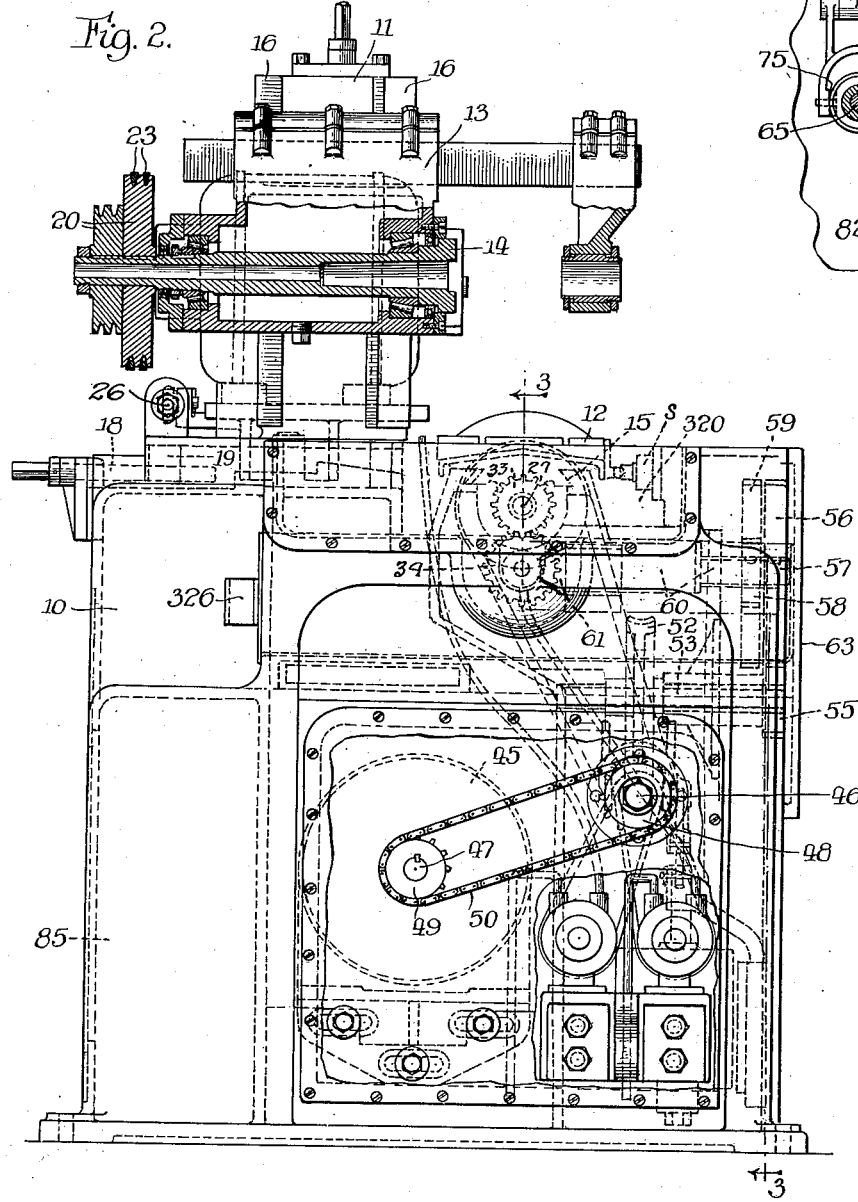

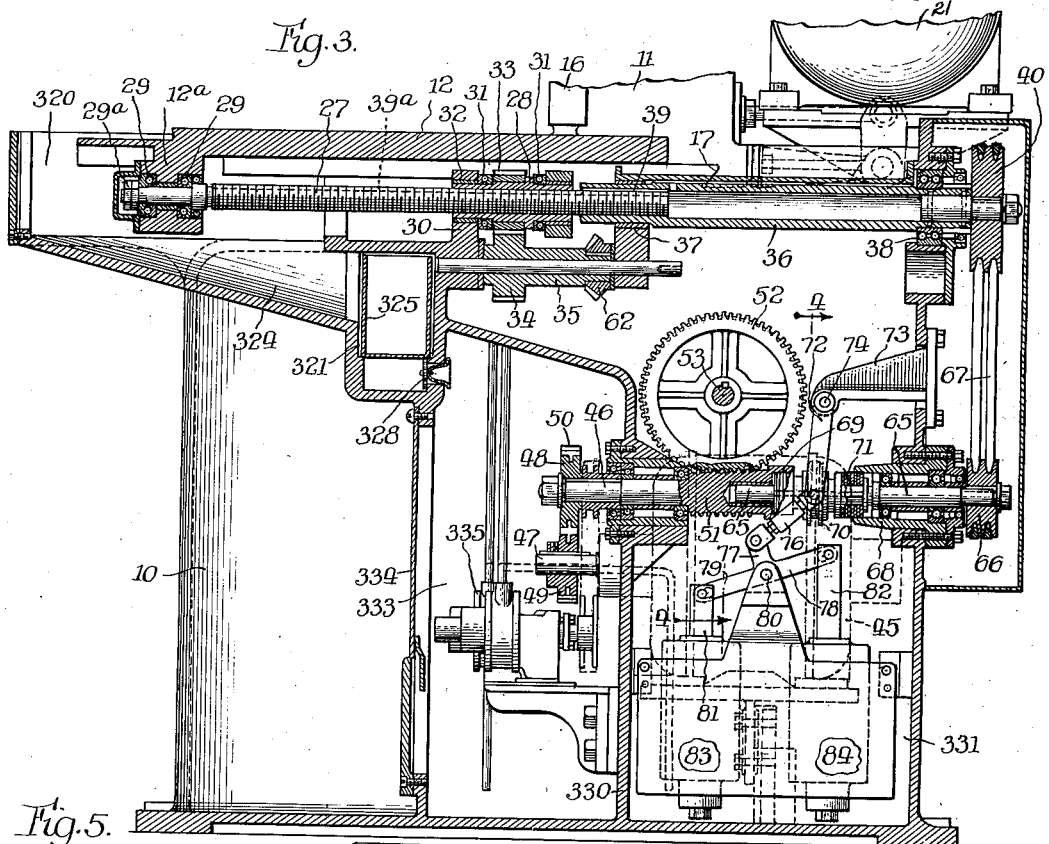

Jan. 15, 1935.  L. A. DUMSER  1,988,267
MACHINE TOOL
Filed Jan. 15, 1932  4 Sheets-Sheet 4

Inventor:
Leo A. Dumser,
By his Atty.

Patented Jan. 15, 1935

1,988,267

UNITED STATES PATENT OFFICE 1,988,267

MACHINE TOOL

Leo A. Dumser, Rockward, Ill., assignor to Sundstrand Machine Tool Co., Rockford, Ill., a corporation of Illinois Application January 15, 1932, Serial No. 586,862

26 Claims. (Cl. 90—21)

This invention relates more particularly to an actuating mechanism for reciprocating the tool or work support of a machine tool.

An object of the invention is to provide a new and improved mechanism for reciprocating the movable support of a machine at feed and traverse rates, which is simple in construction, accurate and efficient in operation, and which will operate with a minimum of wear and tear.

Another object is to provide such a mechanism particularly adapted for high speed operation and capable of providing for a number of complete operating cycles per minute.

Another object is to provide an actuating mechanism for feeding and traversing a reciprocatory support embodying a reversible electric motor for driving the support in forward and reverse directions, together with mechanical means forming a driving connection between the motor and support and incorporating shiftable gearing arranged to actuate the support at feed and traverse rates.

Another object is to provide such an actuating mechanism, together with automatic means for controlling the reversing motor and feed-traverse mechanism, embodying electrically operated devices controlled by dogs secured to the support.

Another object is to provide a machine tool embodying a rotatably mounted support and a reciprocatory support together with a spindle motor for driving the rotary support, a reversible feed motor and feed-traverse gearing for actuating the reciprocatory support, and control mechanism operable automatically to cause the reversal of said reciprocatory support and simultaneously to stop said rotatably mounted support and including adjustable means effective in one position to cause the work support to reciprocate continuously and in another position to cause the work support to stop after a forward and return movement thereof.

Another object is to provide a milling machine embodying a rotatably mounted cutter support and a reciprocatory work support, together with separate motors for actuating said supports, control mechanism operable automatically to cause the reversal of said reciprocatory support and simultaneously to stop said rotatably mounted support, and embodying means adjustable to permit the rotary support to continue in operation upon a reversal of the work support.

Another object is to provide a machine tool of novel construction embodying a base, movably mounted work and cutter supports, said base having a recess therein for the reception and accumulation of chips and a removable receptacle positioned in said recess and adapted to be withdrawn for the purpose of removing chips.

Further objects and advantages will become apparent from the following detailed description taken in connection with the accompanying drawings, in which:

Fig. 2 is an elevation looking at the left-hand end of Fig. 1, partly in section along the line 2—2 of Fig. 1, and with certain portions broken away to illustrate internal parts more clearly.

Fig. 3 is a fragmentary front view partly in section approximately along the line 3—3 of Fig. 2.

Fig. 4 is a fragmentary section approximately along the line 4—4 of Fig. 3.

Fig. 5 is a fragmentary plan view, partly in section, of the table and automatic control mechanism.

Figure 1:
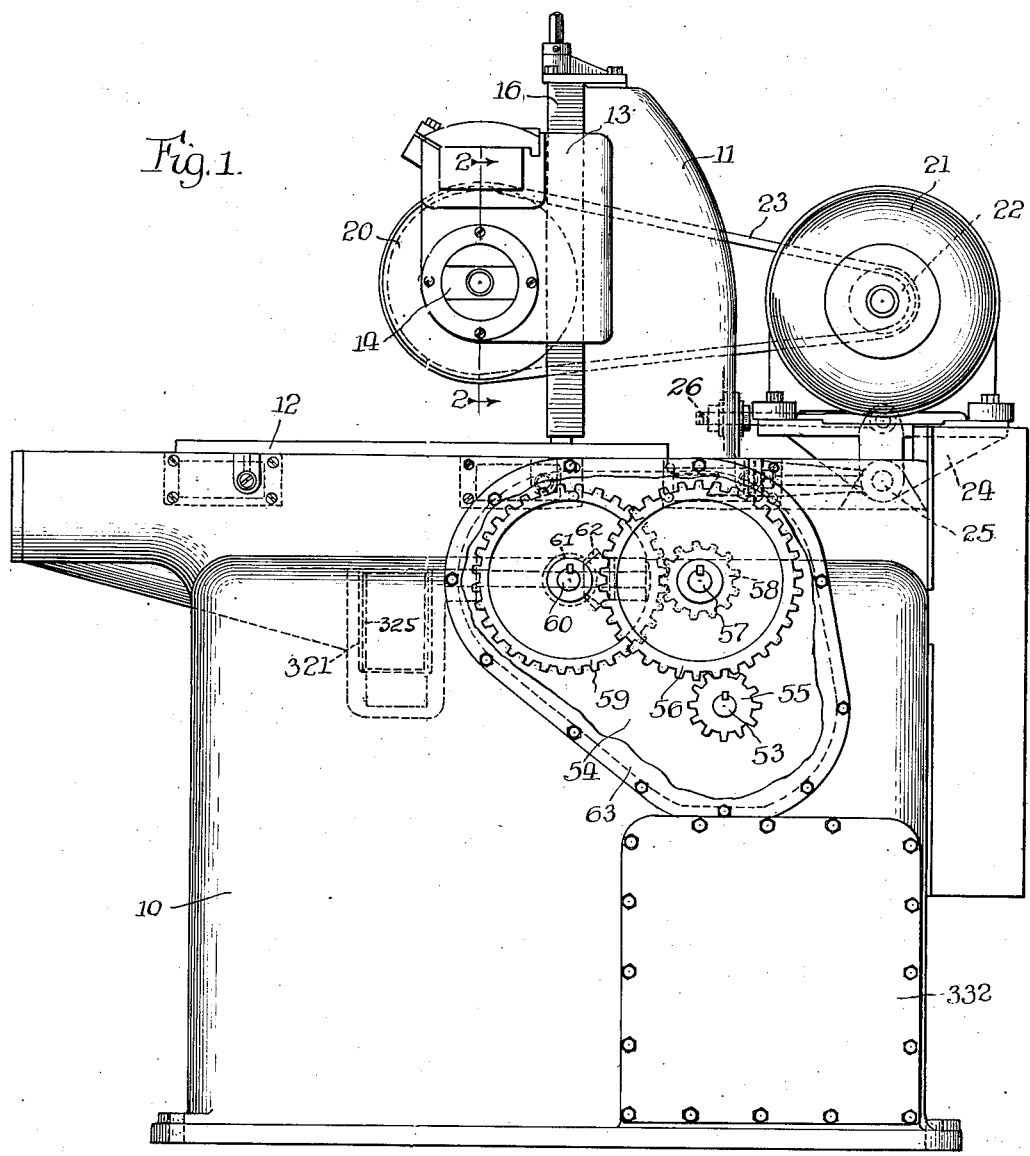
Fig. 1 is a front elevational view of a milling machine embodying a preferred form of the invention, certain portions being broken away to illustrate internal parts more clearly.

While I have shown in the drawings and shall herein describe in detail a preferred embodiment of the invention incorporated in a milling machine operated on polyphase alternating current, it is to be understood that I do not thereby intend to limit the invention to the specific form of machine disclosed. It is contemplated that various changes may be made by those skilled in the art and that the invention may be equipped for operation on direct current as well, without departing from the spirit and scope of the invention as expressed in the appended claims.

As illustrated in the drawings, the invention is, in the form chosen for purposes of disclosure, embodied in a milling machine comprising a base or bed 10 having a column 11 uprising from the rear portion thereof, a table 12 slidably mounted on the bed in front of the column, a head 13 slidable vertically on the column 11, and a cutter spindle 14 rotatably mounted in said head on a horizontal axis extending transversely of the table. The table 12 is guided for movement on the base by means of suitable ways 15. The head 13 is slidable on ways 16 on the column. Preferably the column is mounted for movement longitudinally of the spindle, on ways 17 formed on the base 10, and may be adjusted by means including a screw 18 rotatably mounted on the base and engaging a suitable nut 19 on the column.

As illustrated herein the spindle 14 has a cone type pulley 20 secured to its rear end and fashioned to receive a V-type of belt. This spindle is arranged to be driven directly by means of a two-speed motor 21 which is mounted on the base 10 and has an oppositely positioned cone pulley 22 on its drive shaft. In this way, and by changing the pulley sizes, the spindle 13 may be driven at any one of a plurality of relatively high speeds by means of a multiple V-type belt 23, thus avoiding use of gears and providing an extremely silent and efficient drive for the spindle. The motor 21 is preferably mounted on a swinging bracket 24 which is pivoted on the base at 25 and adjustable by means including a screw device 26.

The table or work support 12 is arranged to be reciprocated at feed and traverse rates by means including a screw and nut device comprising a screw 27 which is rotatably mounted on the table (Figs. 1 and 3) and a nut 28 which is rotatably mounted on the base. As illustrated most clearly in Fig. 3, the screw 27, at its left-hand end, passes through an aperture in a depending portion 12a of the table 12 and is rotatably mounted thereon by means of a pair of antifriction bearings 29 and nuts 29a, so as to be held against longitudinal movement relatively to the table. The nut 28 is in screw threaded engagement with the screw and is mounted in a bracket 30 on the base 10 by means of antifriction bearings 31 and sleeve bearings 32. Intermediate the antifriction bearings 31 the nut has a portion thereof in the form of a gear 33 which is continuously in mesh with a pinion 34 secured to a short shaft 35 which is rotatably mounted in the base parallel to the screw 27 and forms part of the driving mechanism for the nut.

The screw 27 is arranged to be driven by means of a splined connection with a sleeve 36 which is rotatably mounted in the upper portion of the base 10 by means of bearings 37 and 38. This sleeve has an internal spline 39 which engages in a suitable slot 39a extending longitudinally in the screw 27 and on its outer end carries a pulley 40.

In the form illustrated herein the table is arranged to be moved at a relatively low or feed rate of speed by rotating the nut 28 while the screw 27 is held against rotation, and is arranged to be moved at a relatively high or traverse rate by rotation of the nut and screw in opposite directions. Similar movements of the table in forward and reverse directions are obtained by reversing the entire drive mechanism. Preferably the feed-traverse mechanism is driven by a reversible electric motor 45 (Figs. 2 and 3) which motor is reversed as hereinafter more fully described when it is desired to reverse the direction of movement of the talbe.

The feed-traverse mechanism, in addition to the parts already described, comprises a shaft 46 (Figs. 2 and 3) which is rotatably mounted in the base 10 in parallel relation to the feed screw 27 and also in parallel relation to the drive shaft 47 of the motor 45. This shaft carries a drive member or sprocket 48 adjacent its left-hand end which is connected to a similar sprocket 49 on the motor drive shaft by means of a suitable chain 50. For driving the nut 28 a worm 51 is formed on the shaft 46 and meshes with a worm wheel 52 secured to a transversely extending shaft 53. The shaft 53 at its forward end (see Figs. 1 and 2) extends into a recess 54 in the front of the base 10 and is splined to support a detachable pick-off gear 55. The gear 55 meshes with a second pick-off gear 56 which is splined to the forward end of a stub shaft 57 rotatably mounted in the base. A pick-off gear 58, also splined to the shaft 57, meshes with a pick-off gear 59 which is detachably splined to the front end of a rearwardly extending shaft 60. This shaft, at its rear end carries a bevel gear 61 which meshes with a bevel gear 62 (Fig. 3) secured to the shaft 35. Thus the nut 28 is driven from the shaft 46 through intermediate gearing which embodies pick-off gears which may be readily changed for the purpose of altering the speed of the nut. A detachable cover 63 is preferably provided for the recess 54 and to hold the pick-off gears on the shafts.

The means for driving the feed screw and for holding the feed screw against rotation when the nut alone is to be rotated is herein disclosed as comprising a shaft 65 (Fig. 3) having its left hand end journaled in a bore in the right-hand end of the shaft 46, which shaft carries a pulley 66 which may be connected to the pulley 40 on the sleeve 36 by means of a multiple V-type belt 67. The shaft 65 is arranged to be clutched to the shaft 46 for the purpose of driving the feed screw and is arranged to be clutched to a stationary member 68 on the base for the purpose of holding the feed screw against rotation. Preferably a friction type clutch 69 is provided for connecting the shaft 65 to the shaft 46 and is operable by means of a shiftable member 70. A friction clutch 71 is provided for connecting the shaft 65 to the stationary member 68 and is also operable by means of the shiftable member 70. Thus by shifting the member 70 to the left (Fig. 3) when the shaft 46 is rotating, the screw and nut are both driven, and by shifting the member 70 toward the right the nut 28 alone is driven. The shiftable clutch member 70 is arranged to be actuated by means of a yoke 72 which is pivotally mounted at its upper end on a bracket 73 by means of a pin 74, and has a bifurcated lower end provided with lugs 75 which engage in a suitable groove in the member 70. The lower end of the yoke 72 is also connected to one end of an adjustable link 76, the other end of which is connected to one leg 77 of an inverted T-shaped lever 78 pivotally mounted on a stationary support 79 by means of a pin 80. The opposite ends of the lever 78 have pin-and-slot connections with cores 81 and 82 of solenoids 83 and 84. Thus when the core 81 is down, as illustrated in Fig. 3, the clutch 69 is engaged to rotate the feed screw, and by oscillating the lever 78 in a clockwise direction (when solenoid 84 is energized and core 82 is drawn downwardly) the member 70 is shifted toward the right to disengage the clutch 69 and engage the clutch 71, thereby holding the feed screw against rotation.

In the preferred form of the invention, means is provided for controlling the movements of the table both manually and automatically. The reversal of the table is obtained, as mentioned hereinbefore, by reversing the direction of rotation of the feed motor 45, and the speed of the table may be changed from feed to traverse and vice versa by means including the solenoids 83 and 84. The table is arranged to be started and stopped by starting and stopping the feed motor. The control mechanism is illustrated diagrammatically in Fig. 6. Preferably the control mechanism includes trip mechanism positioned adjacent the table, which mechanism is herein shown as comprising a plurality of switch devices S, S' and S" mounted on the base 10 (Figs. 1, 2 and 5), and an electrically operated switch gear which may be mounted on a panel in a compartment 85 in the rear portion of the base 10. Furthermore the control mechanism, as hereinafter more fully described, includes readily adjustable means in the form of switch devices, one of which is effective in one position to cause the work support to be reciprocated continuously and is effective in another position to cause the work support to be stopped after movement in a forward and return direction, and another of which is effective in one position to cause the spindle to be stopped when the work is reversed and is effective in another position to permit the spindle to operate continuously during reciprocatory movement of the work support. Thus in addition to the flexibility provided in the actuation of the work support by the mechanism hereinbefore described, the invention also provides for a marked flexibility in the operation of the control mechanism and is readily adapted for convenient modification to meet various operating requirements.

Figure 6:
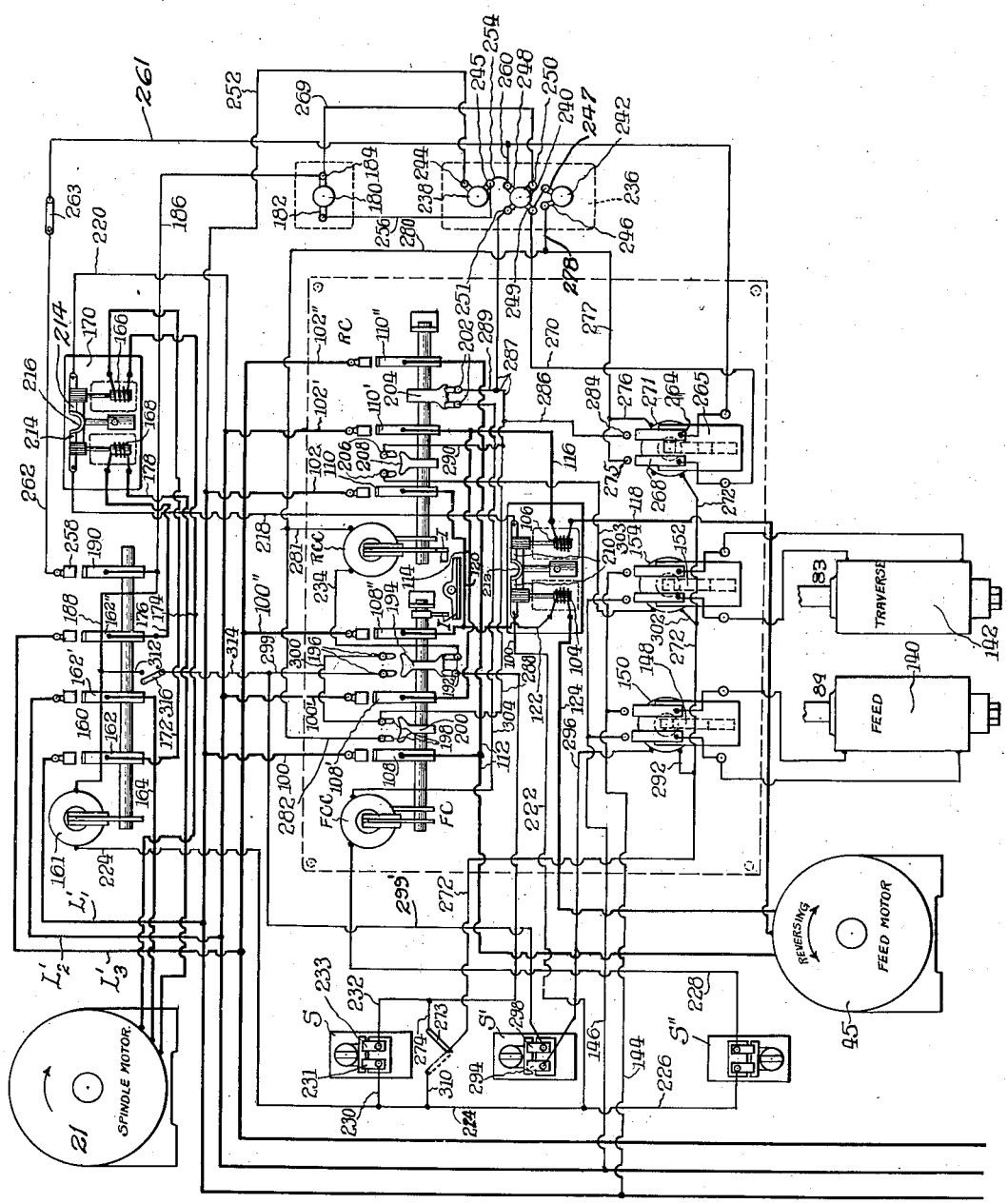
Fig. 6 is a diagrammatic view of the control mechanism.

Referring more particularly to Fig. 6, L—1, L—2 and L—3 represent the line wires of a three phase alternating current circuit from which power is derived for operating the spindle motor 21 and the feed motor 45. The feed motor is arranged to be connected to the line wires either through a three-pole "forward" contactor FC operable by means of a coil FCC or a "reverse" three-pole contactor RC operable by means of a coil RCC. Preferably a mechanical interlock device I is provided so as to prevent both contactors from being closed simultaneously. Since the construction of such contactors is well known in the art, it is believed unnecessary to describe the mechanical structure thereof in further detail.

The stationary contacts of the forward contactor are connected to the line wires by means of connections 100, 100' and 100", and similarly the stationary contacts of the reverse contactor are connected to the line wires by means of connections 102, 102' and 102". The movable elements of the contactors are connected to the motor 45, overload relays having coils 104 and 106 being preferably inserted in two phases. As illustrated herein, the first line elements 108 of the forward contactor and the third line element 110" of the reverse contactor are connected together and to the motor by means of a connection 112. The second line element 108' of the forward contactor and the second line element 110' of the reverse contactor are connected together by a wire 114 and to the motor by means of connections 116 and 118 through the overload relay coil 106. The third line element 108" of the forward contactor is connected to the first line element 110 of the reverse contactor by a wire 120 and both are connected to the motor by means of connections 122 and 124, through the overload relay coil 104. Thus, it will be apparent that when the forward contactor is closed the motor will be driven in one direction, and when the reverse contactor is closed the motor will be driven in the opposite direction.

In the preferred form of the invention the cyclic operation of the work support is preferably controlled automatically by means of switches arranged to be operated by dogs carried on the support. Thus, as illustrated in Figs. 5 and 6, switches S, S' and S" are supported on the base adjacent the front longitudinal edge of the table and are arranged to be actuated by means of dogs D, D' and D" mounted adjustably on the table. These switches may be of a type embodying a pair of relatively movable contacts, one of which is operable by means of a plunger 134 slidably mounted in a cover 136 for the switch. The plunger is normally urged to its extended position by means of a coiled spring 138 and is arranged to be depressed by the proper dog. As illustrated in the drawings (Figs. 5 and 6) the contacts of the switch S are normally closed, the contacts of the switch S' are normally open, and the contacts of the switch S" are normally closed. In the particular arrangement shown, in Figs. 5 and 6, the control mechanism is arranged for obtaining a table cycle comprising rapid approach, feed, and rapid return and stop. In this instance the switch S' is operable by the dog D' to energize a coil 140 of the solenoid 84 to engage the clutch 71, whereby the table will be moved at a feed rate toward the right (Figs. 1 and 5). The switch S" is operable by the dog D" to energize a coil 142 of the solenoid 83 to shift the clutch element 70 and engage the clutch 69, so that the table will be moved at a traverse rate, and simultaneously reverses the feed motor 45 so as to return the table at a rapid traverse rate. The switch S is operable by the dog D to reverse the feed motor 45 at the end of the return stroke and thereby cause the table again to move toward the right at a traverse rate through the rapid approach portion of the next cycle. However by making slight changes in the connections as hereinafter described, it is possible to use the switch S to stop the feed motor.

The feed coil 140 of the solenoid 84 is arranged to be connected across extensions 144 and 146 of the lines L—1 and L—2 by means of a two-pole contactor 148 having an operating coil 150. This contactor is normally open. Similarly the traverse coil 142 of the solenoid 83 is arranged to be connected across the line extensions 144 and 146 by means of a two-pole contactor 152 having an operating coil 154. In operation the solenoids function not only to engage the friction type clutches, but also to hold the respective clutches in engagement. This combination eliminates the difficulties experienced with jaw type clutches which are difficult to disengage accurately when transmitting power. The invention in this manner provides for an extremely accurate control in changing from feed to traverse or vice versa, and in reversing and stopping the work support.

Fig. 6 also discloses the control for the spindle motor, which control may be interconnected with the feed motor control to obtain various operating cycles. Preferably the spindle motor control includes a line contactor 160 having an operating coil 161, movable elements 162, 162' and 162" arranged to be engaged with line extensions L—1', L—2' and L—3'. The movable element 162' is connected directly to the spindle motor by means of a wire 164, whereas the elements 162 and 162" are connected to the motor through coils 166 and 168 of an overload relay 170 by means of wires 172, 174, 176 and 178. The spindle motor may be started by means of a "start" push button 180, one contact 182 of which is connected to line L—1 as hereinafter more fully described, and the other contact 184 of which is connected to one end of the contactor operating coil 161 by means of wires 186 and 188. The other end of the operating coil is normally connected to the line L—2 through the trip devices on both of the overload relays so that if either the spindle motor or the feed motor stops due to overload the other motor will also be stopped. Once the spindle motor has been started by means of the button 180, the contactor 160 is held in by means of a fourth pole 190 on the contactor which closes a holding circuit for the coil 161 shunting the start button 180. Furthermore, as hereinafter more fully described, the holding circuit for the spindle contactor coil may be connected through an interlock on the forward contactor for the feed motor so that the spindle motor will be stopped when the feed motor is reversed, thereby preventing the cutter from marring the work during the return stroke.

The forward feed motor contactor FC is provided with a pair of interlock contacts 192 arranged to be connected together by a member 194 when the contactor is open, and is also provided with a second pair of interlock contacts 196 arranged to be connected together by said member when the contactor is closed. A third pair of interlock contacts 198 is arranged to be connected together when the contactor is closed by means of a member 200. The reverse contactor RC has a pair of interlock contacts 202 arranged to be connected together by a member 204 when the contactor is open, and a pair of interlock contacts 206 arranged to be connected together by a member 208 when the contactor is closed. The overload relay for the feed motor has a pair of control contacts 210 normally closed by a member 212 during normal operation, and similarly the overload relay for the spindle motor has a pair of control contacts 214 closed by a member 216 during normal operation. The adjacent control contacts of the two overload relays are connected in series by means of a wire 218. The other contact 214 of the spindle motor relay is connected to the line L—2 by means of a wire 220 and the other contact 210 of the feed motor relay is connected to one side of each contactor operating coil, the connections to operating coil FCC comprising wires 100, 222, 226, switch S" and wire 228, and the connections to the operating coil 161 comprising wires 100, 222 and 224. The connection to the spindle motor contactor coil 161 comprises wires 222 and 224. The connection to the forward contactor coil FCC for the feed motor comprises wires 222 and 226, normally closed switch S" and wire 228. The connection to the reverse contactor coil RCC comprises wires 222, 224 and 230, normally closed contacts 231 and 233 of switch S, wire 232, interlock contacts 192 of the forward contactor, and wire 234.

In addition to the dog operated switches a manually operable push button station 236 is preferably provided embodying "stop", "start" and "reserve" push buttons 238, 240 and 242. Such push button stations are of well known construction, the stop button contacts 244 and 245 being normally closed, the reverse button contacts 246 and 247 normally open, and the start button having a pair of normally closed contacts 248 and 249 and a pair of normally open contacts 250 and 251. The start button is preferably so arranged that when it is depressed it opens the contacts 248 and 249 and connects together contacts 248, 250 and 251. The stop button is herein used for stopping both the spindle motor and the feed motor and for that reason the contact 244 thereof is connected directly to line L—1 by means of a wire 252 and all control current passes through the stop button contacts. The stop button contact 245 is connected to the start button contact 248 by means of a wire 254 and is also connected to the spindle start button contact 182 by means of a wire 256. The start button contact 248 is also connected to the stationary contact 258 of the fourth pole 190 of the spindle motor contactor by means of wires 260, 261 and 262 and a link 263, and is connected to one pole 264 of a two-pole control relay 265 by means of wires 260 and 266. Contact 249 of the start button is connected to the other pole 268 of the control relay by means of a wire 270. Contact 250 of the start button is connected to contact 184 of the spindle start button 180 by a wire 269, so that when desired both motors may be started by pressing the start button 240. The control relay has an operating coil 271 one end of which is connected to the line L—2 through a wire 272, a movable link 273, a wire 274, and the wire 232. The other end of the operating coil and one stationary contact 275 of the control relay are connected to the contact 246 of the reverse push button by means of wires 276, 277 and 278 and are further connected to the operating coil RCC of the reverse contactor and to one of the interlock contacts 198 on the forward contactor by means of wires 280, 281 and 282. The other stationary contact 284 of the control relay is connected to the start push button contact 251 by means of wires 286 and 287. This control relay contact is also connected to one each of the interlock contacts 198, 202 and 206 by means of additional wires 288, 289 and 290.

The coil 150 of the solenoid feed coil contactor 148 has one end thereof connected to the wire 272 by means of a wire 292 and is thereby normally connected to the line L—2. The other end of the coil 150 is connected to one contact 294 of the normally open dog operated switch S' by means of a wire 296. The other contact 298 of the switch S' is connected to one of the interlock contacts 196 by means of wires 299' and 299, the other of said interlock contacts being connected to one of the interlock contacts 198 by means of a wire 300. The traverse contactor coil 154 also has one end thereof connected to the wire 272 by means of a wire 302 and has its other end connected to one of the interlock contacts 206 by means of a wire 303. A wire 304 connects the other contact 202 with the forward contactor coil FCC.

With the control just described the machine may be operated as follows: By pressing the start button 180 the spindle contactor is closed and the spindle motor started. The spindle contactor is then held in, even after the said start button is released, by means of the holding circuit established through the fourth pole 190 of the contactor. The feed motor may then be started by depressing the start button 240 whereupon the forward contactor FC is closed, the contact 251 of the start button being momentarily connected to one side of the coil FCC by means of the wires 287 and 289, interlock contacts 202 on the reverse contactor and a wire 304. A holding circuit for the coil FCC is then established through the interlock contacts 202 and the control relay 265 which closes immediately after the forward contactor closes. The table will then be propelled toward the right (Fig. 5) at a traverse rate (assuming that the traverse solenoid coil 142 was the last to be energized) until the dog D' engages the plunger of the switch S' and connects the contacts 294 and 298 together. Thereupon the feed coil 140 of the solenoid is energized so as to operate the clutch device 71 and drive the table at a feed speed. The movement of the table then continues toward the right until the dog D'' engages the plunger of the normally closed reversing switch S'' whereupon the circuit to the forward contactor coil FCC is broken. When this contactor opens the interlock contacts 192 are connected together by the member 194 and establish a circuit to the coil RCC of the reverse contactor, thus closing the reverse contactor and reversing the direction of the motor 45. When the reverse contactor is closed the traverse coil 142 of the solenoid device is energized upon the closing of the interlock contacts 206 by the member 208 so that substantially simultaneously with the reversing of the motor the feed-traverse gearing is arranged to drive the table at a traverse or rapid return rate.

With the control arranged as hereinbefore disclosed the table will move in a reverse direction until the dog D engages the plunger of the switch S, thereby opening the contacts 231 and 233 of said switch and breaking the circuit to the reverse contactor coil RCC. When the switch S is opened the circuit is also broken to the coil 271 of the control relay 265 so that both the forward and reverse contactors will remain open and the table will stop.

If it is desired to repeat automatically the cycle just outlined instead of having the table stop at the end of the return stroke, it is merely necessary to disconnect the movable link 273 from the wire 274 and connect it between the wire 272 and the adjacent end of a wire 310 which is connected to the wire 224. By doing this the circuit to the control relay coil 271 remains closed when the reverse contactor drops out due to the opening of the switch S, and the forward contactor coil FCC is thereby energized through the interlocks 202 and member 204 of the reverse contactor and the connections to the pole 264 of the control relay. This cycle is of particular advantage where quickly operable fixtures are mounted on the table for replacing a finished work piece with a new blank, or when a multiple position work fixture is used which may be indexed for presenting a new work blank. If desired suitable means may be used in connection with the forward contactor FC to delay its closing action and thereby cause a slight dwell in the movement of the work support at the end of the return stroke to give additional time for loading.

In some instances it is desirable to stop the spindle motor when the table is reversed so as to prevent the cutter from marring finished work pieces. This may be accomplished by connecting the holding circuit for the spindle contactor coil 161 through the interlocks 196 and 198 on the forward contactor instead of directly to the stop push button 238 through the fourth pole 190, wires 262, link 263, and wires 261, 260 and 254. As illustrated in Fig. 6, this may be readily accomplished by disconnecting the removable link 263 in the line and instead connecting the wire 188 to the wire 299 by means of wires 312 and 314 and a link 316. Thus with the link 263 removed and the link 316 inserted the spindle motor will stop when the table is reversed and by removing the link 316 and inserting the link 263 the spindle motor will continue operating when the table is reversed.

As illustrated in the drawings, provision is preferably made for the ready removal of chips. With the high production demanded of present day machines, chips accumulate very rapidly, and in order to avoid the necessity of an operator spending a considerable portion of his time brushing away and removing chips from the work support and the base I preferably provide a recess 320 (Figs. 2, 3 and 5) in the base 10 surrounding the table 12 so that during operation of the machine the chips fall off the table and into said recess. Extending transversely of and underneath the table is a groove or trough 321 formed in the base, and communicating with the recess 320 by means of apertures 322 and 323 in front of and to the rear of the table 12, respectively, and an inclined chute 324 (Fig. 3). This groove is preferably positioned below and to the left of the cutter axis, when the cutter is arranged to rotate in a clockwise direction looking at Fig. 1, so that the chips tend to fall into the groove through the apertures 322 and 323. A container or drawer 325 which is open at its upper end is positioned in the groove 321 and is arranged to be withdrawn toward the rear (upwardly in Fig. 5) by means of a handle 326. Preferably the container 325 is provided with screened openings 327 in the bottom thereof so that any cutter coolant entering the container may be drained off through the lower portion of the groove 321 and a suitable strainer 328. In this way the chips are readily removed from the work support and recess 320 to the container 325 which may then be withdrawn at suitable intervals and emptied.

As illustrated most clearly in Fig. 3, the base 10 has an internal wall 330 forming a compartment 331 in which the feed-traverse mechanism and solenoids are positioned, thus enabling this mechanism to be immersed in oil. A removable cover plate 332 on the front of the base permits of access to this compartment. An adjacent compartment 333 on the other side of the wall 330 is accessible through a detachable screen or plate 334 and houses a coolant pump 335. The lower portion of this compartment is used as a reservoir for the coolant so that coolant draining through the screen 328 falls into the coolant reservoir.

I claim as my invention:

1. A machine tool having, in combination, a base, a work support slidably mounted on said base, a reversible electric motor for reciprocating said support at feed and traverse speeds, feed-traverse gearing connecting said motor and support including shiftable means for changing from feed to traverse and vice versa, and means for controlling the operation of said motor and shiftable means including a plurality of switch devices positioned on said base adjacent said support and spaced from each other along the path of movement of the support, a first dog on the support arranged to actuate one of said devices at the end of support travel in the return direction to cause a reversal of said motor, a second dog arranged to actuate a second of said devices during movement of the support in a forward direction to cause said shiftable means to be actuated to change the speed of the support from traverse to feed, and a third dog arranged to actuate a third of said devices at the end of table travel in a forward direction to cause a reversal of said motor and simultaneously to cause said shiftable means to be actuated to change the speed of the support from feed to traverse.

2. A machine tool having, in combination, a base, a work support slidably mounted on said base, a reversible electric motor for reciprocating said support at feed and traverse speeds, feed-traverse gearing connecting said motor and support including shiftable means for changing from feed to traverse and vice versa, and means for controlling the operation of said motor and shiftable means including a plurality of switch devices positioned on said base adjacent said support, a first dog arranged to actuate one of said devices during movement of the support in a forward direction to cause said shiftable means to be actuated to change the speed of the support, a second dog on the support arranged to actuate another of said devices at the end of support travel in said direction to cause a reversal of said motor, a third dog arranged to actuate a third of said devices at the end of table travel in a return direction to stop the motor, and means adjustable to change the effect of the third dog action to cause a reversal of the motor at the end of the return stroke.

3. A machine tool having, in combination, a base, a work support slidably mounted on said base, a reversible electric motor for reciprocating said support at feed and traverse speeds, feed-traverse gearing connecting said motor and support including electrically actuated shiftable means for changing from feed to traverse and vice versa, and means for controlling the operation of said motor and shiftable means including a plurality of switch devices positioned on said base adjacent said support and spaced from each other along the path of movement of the support, a first dog on said support arranged to actuate one of said devices during movement of the support in a forward direction to cause said shiftable means to be actuated to change the speed of the support from traverse to feed, a second dog arranged to actuate a second of said devices at the end of table travel in a forward direction to cause a reversal of said motor and simultaneously to cause said shiftable means to be actuated to change the speed of the support from feed to traverse, and a third dog on the support arranged to actuate a third of said devices at the end of support travel in the return direction to stop said motor.

4. A machine tool having, in combination, a base, a work support slidably mounted on said base, a reversible electric motor for reciprocating said support at feed and traverse speeds, feed-traverse gearing connecting said motor and support including electrically operated shiftable means for changing from feed to traverse and vice versa, and means for controlling the operation of said motor and shiftable means including a plurality of switch devices, a dog on said support arranged to engage one of said devices during movement of the support in a forward direction to cause said shiftable means to be actuated to change the speed of the support from traverse to feed, means arranged to actuate a second of said devices at the end of table travel in a forward direction to cause a reversal of said motor and simultaneously to cause said shiftable means to be actuated to change the speed of the support from feed to traverse, and means for actuating a third of said devices at the end of the travel of the support in a return direction to stop the motor.

5. A machine tool having, in combination, a base, a work support slidably mounted on said base, a reversible electric motor for reciprocating said support at feed and traverse speeds, feed-traverse gearing connecting said motor and support including shiftable means for changing from feed to traverse and vice versa, and means for controlling the operation of said motor and shiftable means comprising trip mechanism positioned adjacent said support, a first dog on said support arranged to actuate said trip mechanism to cause a reversal of said motor at one end of the travel of the support, a second dog arranged to actuate said trip mechanism to cause a reversal of said motor at the other end of the travel of the support and to cause said shiftable means to be actuated to change the speed of the support from feed to traverse, and a third dog arranged to actuate said trip mechanism and cause said shiftable means to be actuated to change the speed of the support from traverse to feed during movement of the support in one direction.

6. A machine tool having, in combination, a base, a work support slidably mounted on said base, a reversible electric motor for reciprocating said support at feed and traverse speeds, feed-traverse gearing connecting said motor and support including electrically operated shiftable means for changing from feed to traverse and vice versa, and means for controlling the operation of said motor and shiftable means comprising switch mechanism positioned adjacent said support, a first dog on said support arranged to actuate said switch mechanism to cause a reversal of said motor at one end of the travel of the support, a second dog arranged to actuate said switch mechanism to cause a reversal of said motor at the other end of the travel of the support and to cause said shiftable means to be actuated to change the speed of the support from feed to traverse, and a third dog arranged to actuate said switch mechanism and cause said shiftable means to be actuated to change the speed of the support from traverse to feed during movement of the support in one direction.

7. A machine tool having, in combination, a base, a work support slidably mounted on said base, a reversible electric motor for reciprocating said support at feed and traverse speeds, feed-traverse gearing connecting said motor and support including shiftable means for changing from feed to traverse and vice versa, and means for controlling the operation of said motor and shiftable means including first, second and third trip devices positioned on said base adjacent said support and spaced from each other in the order named along the path of movement of the support, means for starting said motor to move the support in a forward direction, a first dog on the support arranged to engage the second trip device to cause said shiftable means to be actuated to change the speed of the support from traverse to feed, a second dog arranged to actuate said third trip device at the end of support travel in one direction to cause a reversal of said motor and simultaneously to change the speed of the support from feed to traverse, and a third dog operable at the end of table travel in the opposite direction to engage said first trip device and stop the motor.

8. A machine tool having, in combination, a base, a work support slidably mounted on said base, a reversible electric motor for reciprocating said support at feed and traverse speeds, feed-traverse gearing connecting said motor and support including electrically operated shiftable means for changing from feed to traverse and vice versa, and means for controlling the operation of said motor and shiftable means including first, second and third switch devices positioned on said base adjacent said support and spaced from each other in the order named along the path of movement of the support, means for starting said motor to move the support in a forward direction at a traverse speed, a first dog on the support arranged to engage the second switch device during forward movement of the support to cause said shiftable means to be actuated to change the speed of the support from traverse to feed, a second dog arranged to actuate said third switch device at the end of support travel in the forward direction to cause a reversal of said motor and simultaneously to change the speed of the support from feed to traverse, and a third dog operable at the end of table travel in the opposite direction to engage said first switch device and stop the motor.

9. A milling machine having, in combination, a base, a work support slidably mounted on said base, a tool support rotatably mounted on an axis extending transversely across said work support, means for rotating said spindle, independently operated means for reciprocating said work support at feed and traverse rates comprising an electric motor arranged to be started and stopped to start and stop the support, feed-traverse gearing connecting the motor and work support so that the support is driven at feed and traverse rates by said motor including shiftable means for changing from feed to traverse and vice versa, means for starting said motor to commence a work support operating cycle, dog controlled means for actuating said shiftable means during movement of the support to change the speed from traverse to feed, dog controlled means for reversing the work support movement and for simultaneously actuating said shiftable means to change the speed from feed to traverse, dog controlled means operable at the end of the return stroke of the support to stop said motor, and dogs on said work support for operating said dog controlled means.

10. A milling machine having, in combination, a base, a work support slidably mounted on said base, a tool support rotatably mounted on an axis extending transversely across said work support, means for rotating said spindle, independently operated means for reciprocating said work support at feed and traverse rates comprising an electric motor arranged to be started and stopped to start and stop the support, feed-traverse gearing connecting the motor and work support so that the support is driven at feed and traverse rates by said motor including electrically operable shiftable means for changing from feed to traverse and vice versa, means for starting said motor to commence a work support operating cycle, dog controlled means for actuating said shiftable means during movement of the support to change the speed thereof, dog controlled means for reversing the work support movement at the end of the forward movement of the support and for simultaneously actuating said shiftable means to change the speed from feed to traverse, dog controlled means operable automatically at the end of the return stroke of the support to stop said motor, and dogs on said work support for operating said dog controlled means.

11. A milling machine having, in combination, a base, a work support slidably mounted on said base, a tool support rotatably mounted on an axis extending transversely across said work support, means for rotating said spindle, independently operated means for reciprocating said work support at feed and traverse rates comprising an electric motor arranged to be started and stopped to start and stop the support, feed-traverse gearing connecting the motor and work support so that the support is driven at feed and traverse rates by said motor including shiftable means for changing from feed to traverse and vice versa so that the motor drives the support at both feed and traverse rates, means for starting said motor to commence a work support operating cycle, trip dog operated means for causing said shiftable means to be actuated to change the speed from traverse to feed during movement of the support in a forward direction, trip dog operated means for reversing the work support movement and for simultaneously causing said shiftable means to be actuated to change the speed from feed to traverse at the end of the forward movement, and trip dog operated means for stopping the motor at the end of the return stroke of the support.

12. A milling machine having, in combination, a rotatably mounted tool spindle, a reciprocatory work table, means for driving the work spindle, and means for reciprocating the work table at feed and traverse rates comprising electrically operated means for changing the speed of the table from feed to traverse and vice versa, electrically operated means for reversing the direction of table movement and for starting and stopping the table, and mechanism for controlling said electrically operated means comprising trip mechanism positioned adjacent said table, a first dog on said table arranged to actuate said trip mechanism to cause said table to stop at one end of the travel thereof, a second dog arranged to actuate said trip mechanism to cause a reversal of said table at the other end of the travel thereof and simultaneously to change the speed of the table travel from feed to traverse, and a third dog arranged to actuate said trip mechanism to change the speed of the table travel from traverse to feed during movement of the table in one direction.

13. A milling machine having, in combination, a rotatably mounted tool spindle, a reciprocatory work table, means for driving the work spindle, and means for reciprocating the work table at feed and traverse rates comprising electrically operated means for changing the speed of the table from feed to traverse and vice versa, electrically operated means for reversing the direction of table movement and for starting and stopping the table, and mechanism for controlling said electrically operated means comprising switch means positioned adjacent said table, manually operable means for starting a forward movement of the table, a first dog arranged to actuate said switch means to change the speed of the table travel from traverse to feed during movement of the table in the forward direction, a second dog arranged to actuate said switch means to cause a reversal of said table at the other end of the travel thereof and simultaneously to change the speed of the table travel from feed to traverse, and a third dog on said table arranged to actuate said switch means to cause said table to stop at the end of the return travel thereof.

14. A milling machine having, in combination, a rotatably mounted tool spindle, a reciprocatory work table, means for driving the work spindle, and means for reciprocating the work table at feed and traverse rates comprising electrically operated means for changing the speed of the table from feed to traverse and vice versa, electrically operated means for reversing the direction of table movement and for starting and stopping the table, and mechanism for controlling said electrically operated means including a plurality of switch devices positioned adjacent said table and spaced from each other along the path of movement thereof, a first dog on the table arranged to actuate one of said devices during a forward movement of the table to change the speed of the table from traverse to feed, a second dog arranged to actuate another of said devices at the end of the forward movement of the table to reverse the table and change the speed thereof from feed to traverse, and a third dog arranged to actuate another of said devices at the end of the return travel of the table to stop the table.

15. A milling machine having, in combination, a base, a work table slidably mounted on said base, means for actuating said table at feed and traverse rates comprising a feed screw rotatably mounted on said table, a nut for said screw rotatably mounted on said base, means for rotating said nut at relatively low speeds for feeding the table when the screw is stationary, means for rotating the screw in the opposite direction from the nut at a relatively high rate for traversing the table and for alternatively holding the screw against rotation during feed movement of the table including an electrically operated shift device for changing the speed of the table from feed to traverse and vice versa, and a reversible electric motor for driving said actuating means in forward and reverse directions, manually operable means for controlling said motor and shift device, and automatic means for controlling said motor and shift device operable by dogs carried on said table.

16. A milling machine having, in combination, a base, a work table slidably mounted on said base, means for actuating said table at feed and traverse rates comprising a feed screw rotatably mounted on said table, a nut for said screw rotatably mounted on said base, means for rotating said nut at relatively low speeds for feeding the table when the screw is stationary, means for rotating the screw in the opposite direction from the nut at a relatively high rate for traversing the table and for alternatively holding the screw against rotation during feed movement of the table including an electrically operated shift device for changing the speed of the table from feed to traverse and vice versa, and a reversible electric motor for driving said actuating means in forward and reverse directions, and means for controlling the starting, reversing and stopping of said motor and the operation of said shift device including switch mechanism operable by dogs carried on said table.

17. A milling machine having, in combination, a rotatable tool spindle, a work support movable transversely of the axis of said spindle and in forward and reverse directions, means for moving said support in either direction including a reversible electric motor, and means for automatically controlling the operation of said motor to reverse the direction of support movement after movement in a forward direction including a trip device movably mounted adjacent one edge of said work support, a dog on said support positioned to actuate said device at the end of the forward movement of the work support, and dog operated means for stopping said motor when said support has been returned to a given position after forward and reverse movement.

18. A milling machine having, in combination, a rotatably mounted tool spindle, a reciprocatory work support, a first electric motor connected to drive said spindle, a reversible electric motor connected to drive said support, means for controlling the starting and stopping of said spindle motor, means for controlling the starting and stopping and reversing of said reversible motor, including trip mechanism arranged to be actuated by dogs on said support, and means connectible between the first motor control means and the reversible motor control means operable to effect the stopping of the spindle motor when the support is reversed.

19. A milling machine having, in combination, a rotatably mounted tool spindle, a reciprocatory work support, a first electric motor connected to drive said spindle, a reversible electric motor for actuating said support, feed-traverse gearing connecting said reversible motor and support and embodying means shiftable to change the speed of the support, means for controlling the starting and stopping of said spindle motor, means for controlling the starting and stopping and reversing of said reversible motor and the operation of said shiftable means, including trip mechanism arranged to be actuated by dogs on said support, and means connectible between the first motor control means and the second motor control means operable to effect the stopping of the spindle motor when the support is reversed.

20. A milling machine having, in combination, a rotatably mounted tool spindle, a reciprocatory work support, a first electric motor connected to drive said spindle, a reversible electric motor for actuating said support, feed-traverse gearing connecting said reversible motor and support and embodying means shiftable to change the speed of the support, means for controlling the starting and stopping of said spindle motor, and means for controlling the starting and stopping and reversing of said reversible motor and the operation of said shiftable means, including trip mechanism arranged to be actuated by dogs on said support, and adjustable switch means effective in one position to cause the support to be reciprocated continuously and effective in another position to cause the support to be stopped at the end of the return movement thereof.

21. A milling machine having, in combination, a base, a work support slidably mounted on said base, a tool support rotatably mounted on an axis extending transversely across said work support, means for rotating said spindle, and independently operated means for reciprocating said work support at feed and traverse rates comprising an electric motor arranged to be started and stopped to start and stop the support, and feed-traverse gearing connecting the motor and work support so that the support is driven at feed and traverse rates by said motor including shiftable means for changing from feed to traverse and vice versa.

22. A milling machine having, in combination, a bed, a table reciprocably mounted upon said bed, a feed screw for the table rotatably journaled therein, a nut for said screw rotatably mounted on the bed, a reversible electric motor, means connecting said motor to drive said nut continuously including alterable change gears, coupling means for alternatively driving said screw from said motor simultaneously with said nut but in the opposite direction to effect a rapid traverse of said table or holding said screw against rotation to effect a feed of said table, and electrically operated means for controlling said motor and said coupling means.

23. A milling machine having, in combination, a rotatable tool spindle, a work support movable transversely of said spindle in forward and reverse directions, means for moving said support in either direction at feed and traverse rates including a reversible electric motor and shiftable gearing connecting said motor and support, electrical means for shifting said gearing, an electric circuit including said motor, said electrical means and circuit control means, and dogs on said support functioning through said control means first to shift said gearing so that the support will move at a feed rate after movement at a traverse rate in a forward direction, then to shift said gearing and reverse said motor so that the support will move at a traverse rate in a reverse direction, and then to stop said motor at the end of the return stroke to stop the support.

24. A machine tool having, in combination, a reciprocatory work support, a reversible electric motor connected to drive said support and arranged to be started and stopped to start and stop the support, and to be reversed to reverse the direction of support movement, dogs carried by said support, and an electric circuit including said motor, trip mechanisms arranged to be actuated by said dogs to vary the circuit to effect starting and stopping and reversing of said motor, and adjustable switch means effective in one position to cause the support to be reciprocated continuously by said motor and effective in another position to cause the support to be stopped at the end of the return movement thereof.

25. A machine tool having, in combination, a base, a support slidably mounted on said base, mechanism for reciprocating said support at feed and traverse speeds comprising a reversible electric motor and feed-traverse gearing permanently connecting said motor and support including a friction type clutch for changing from feed to traverse and vice versa, an electric circuit for said motor, means controlling said circuit to effect starting and stopping of said motor to start and stop said support and to reverse said motor to reverse the direction of support movement, and an electric solenoid operatively associated with said clutch to shift the same to effect feed of said support and to maintain the clutch in shifted position during the feeding movement.

26. A machine tool having, in combination, a base, a work support slidably mounted on said base, mechanism for reciprocating said support at feed and traverse speeds comprising a reversible electric motor and feed-traverse gearing permanently connecting said motor and support including shiftable means for changing from feed to traverse and vice versa, and means for starting and stopping said motor to start and stop the support and to reverse said motor to reserve the direction of support movement and for controlling said shiftable means for changing from feed to traverse and vice versa.

LEO A. DUMSER.